Aug. 28, 1923.

E. H. LORENZ 1,466,367

APPARATUS FOR OPERATING ON MOLTEN GLASS

Filed Sept. 14, 1922  3 Sheets-Sheet 1

Inventor:
Edward H. Lorenz
by W.H.Thomas
Att'y.

Aug. 28, 1923.
E. H. LORENZ
1,466,367
APPARATUS FOR OPERATING ON MOLTEN GLASS
Filed Sept. 14, 1922  3 Sheets-Sheet 2
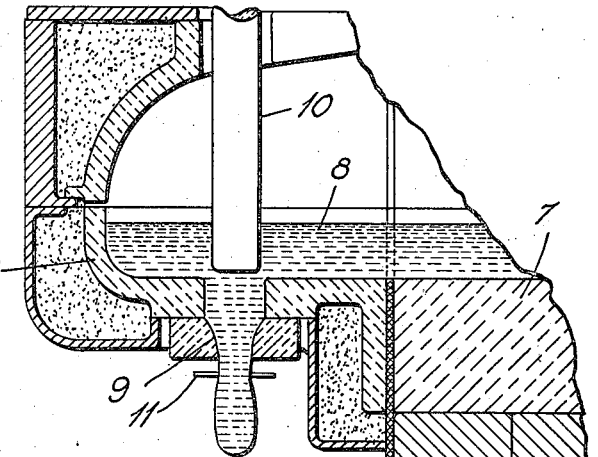
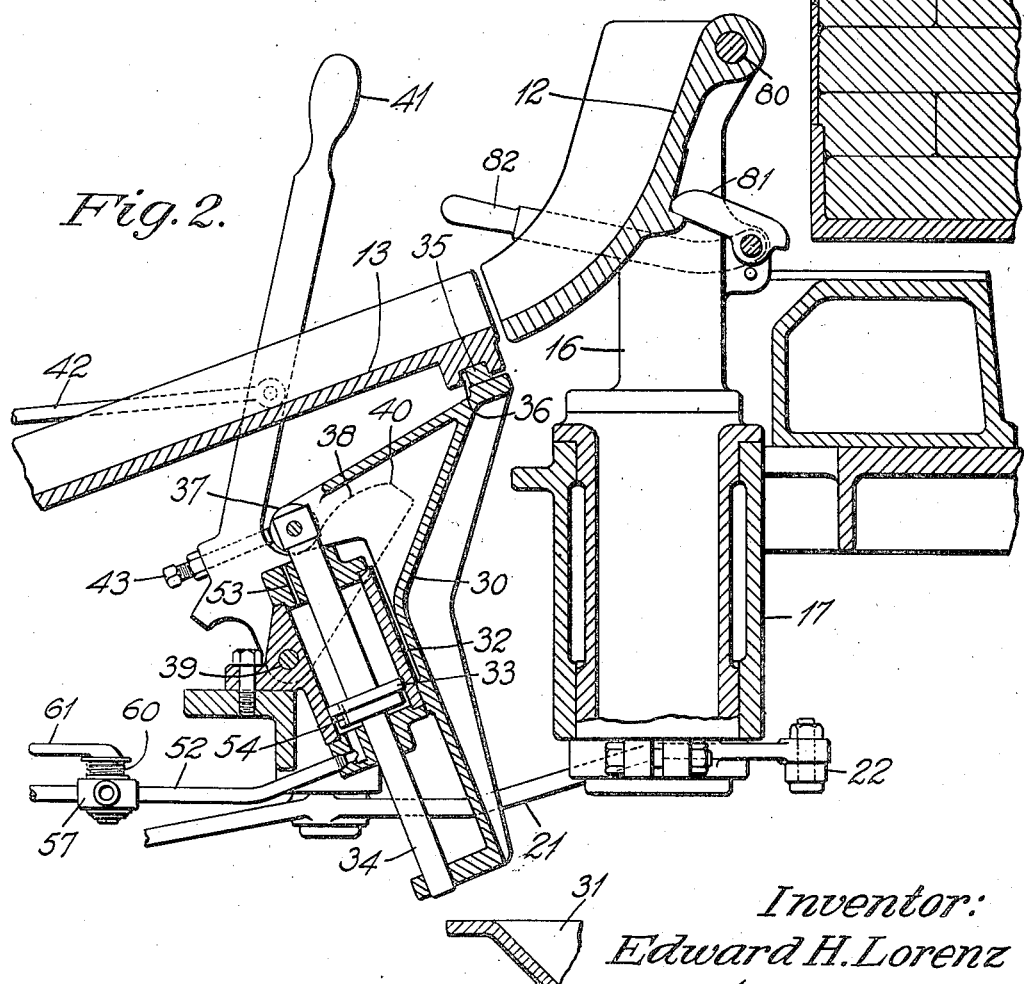
Inventor:
Edward H. Lorenz
by [signature]
Att'y.

Aug. 28, 1923.
E. H. LORENZ
1,466,367
APPARATUS FOR OPERATING ON MOLTEN GLASS
Filed Sept. 14, 1922   3 Sheets-Sheet 3
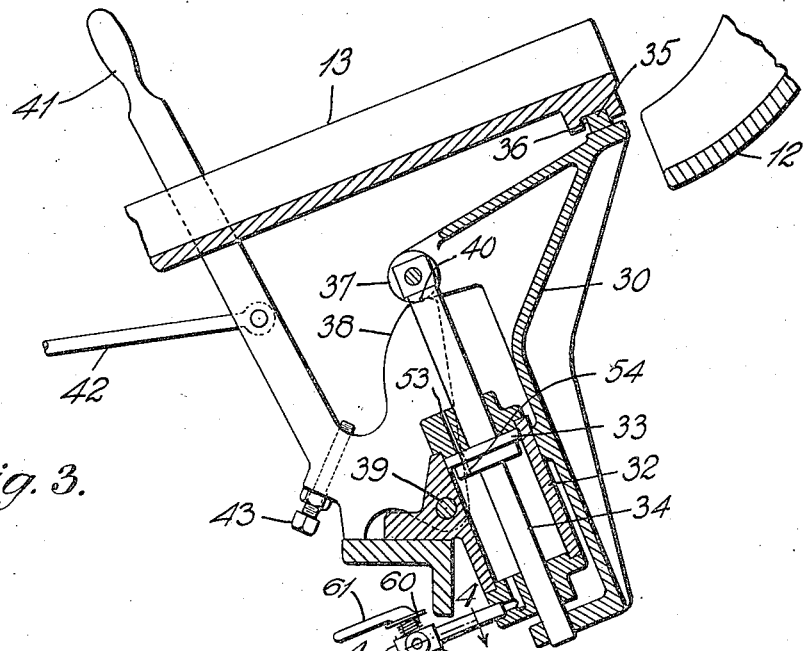
Fig. 3.
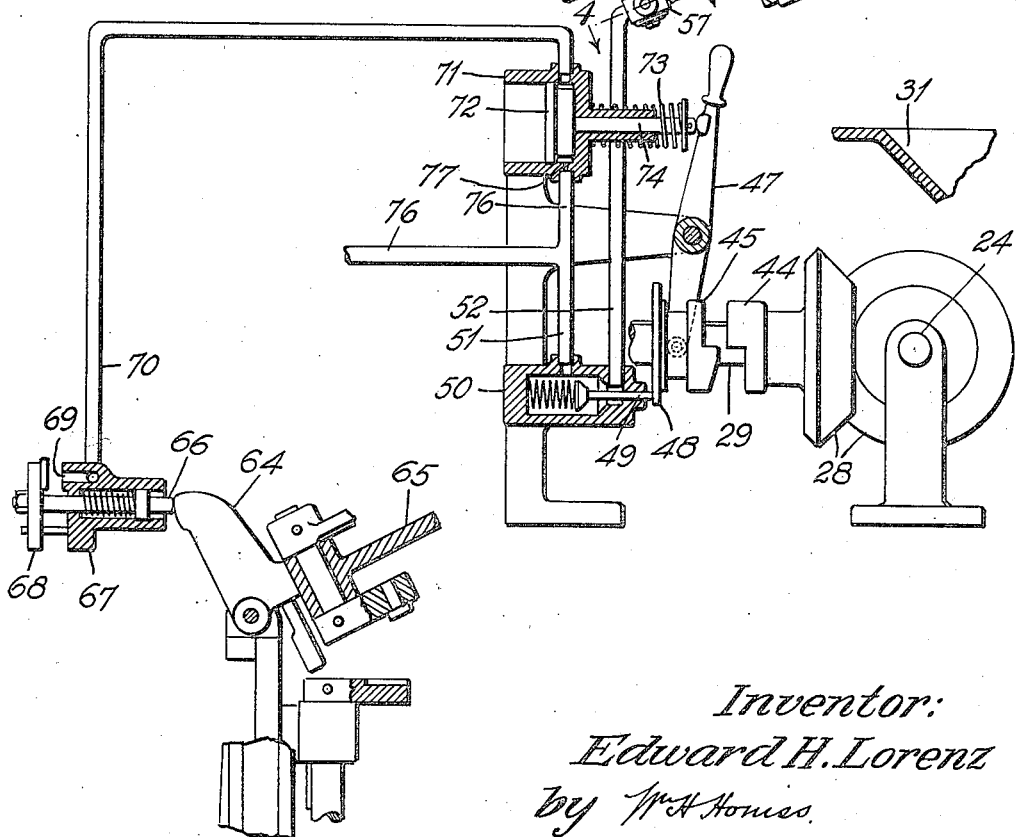
Inventor:
Edward H. Lorenz
by W H Homiss
Att'y.

Patented Aug. 28, 1923.

1,466,367

UNITED STATES PATENT OFFICE.

EDWARD H. LORENZ, OF WEST HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR OPERATING ON MOLTEN GLASS.

Application filed September 14, 1922. Serial No. 588,118.

*To all whom it may concern:*

Be it known that I, EDWARD H. LORENZ, a citizen of the United States, residing at West Hartford, in the county of Hartford and State of Connecticut, have invented new and useful Improvements in Apparatus for Operating on Molten Glass, of which the following is a specification.

This invention relates to apparatus for delivering charges of molten glass to molds on a shaping machine by which they are formed into glassware.

The general object of the invention is to provide improved means for controlling the delivery of the charges to the shaping machine.

A more particular object is to provide automatic means in apparatus of the character described, for stopping the delivery of glass to a shaping machine upon the occurrence of changes in its operating condition, such as stoppage, abnormal, or incomplete operation.

A further object is to provide an apparatus comprising a single glass feeder arranged to deliver mold charges to a plurality of shaping machines, in which such a stoppage or abnormal operation of any machine will act to stop the delivery of glass to that machine without interrupting the continued operation of the other machines.

In the drawings:—

Fig. 2 is a vertical section through the forehearth of a glass furnace and a part of the distributing apparatus taken in part on the line 2—2 of Fig. 1;

Fig. 3 is a diagrammatic view in vertical section; and

Fig. 4 is a section on the line 4—4 of Fig. 3.

Figure 1:
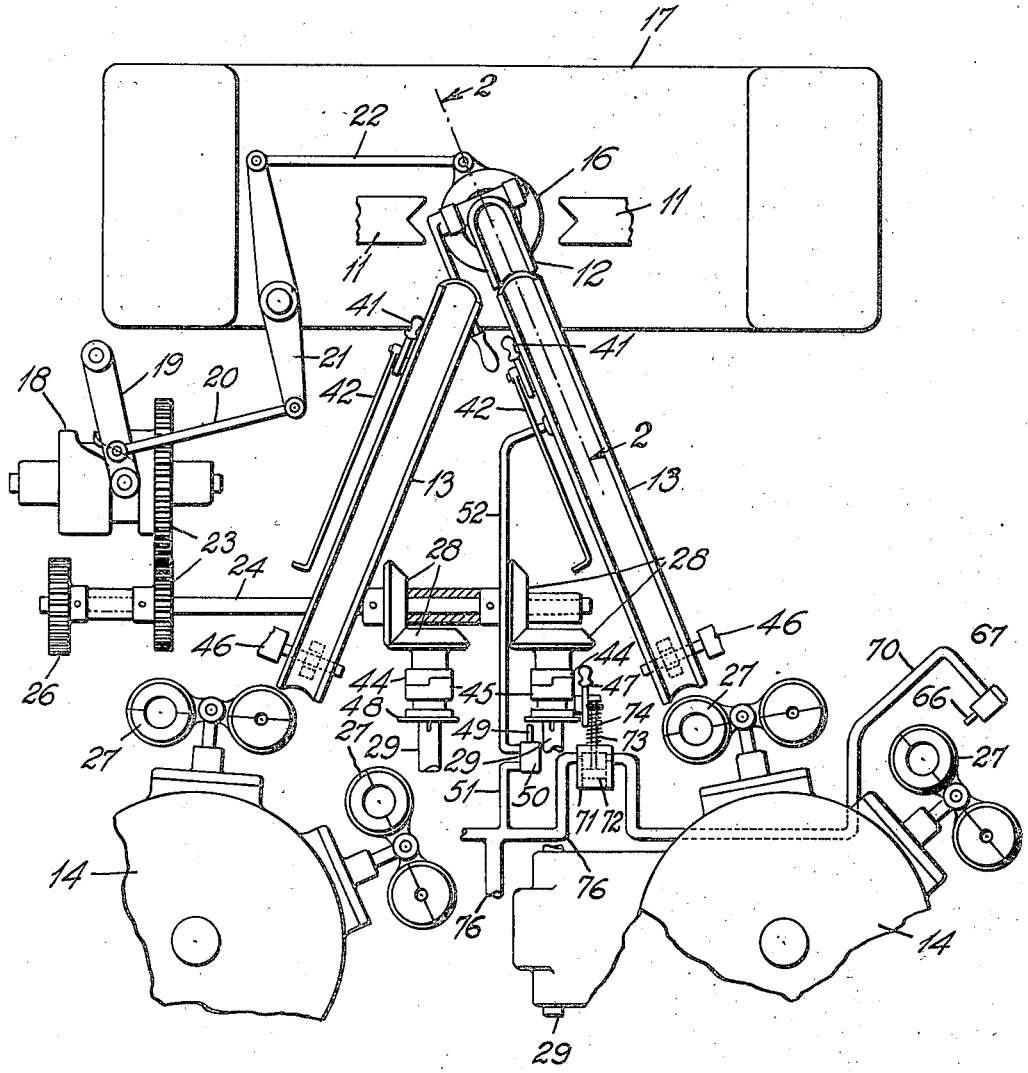
Figure 1 is a diagrammatic plan view of a part of a glass feeding machine arranged to distribute mold charges to two shaping machines.

The particular device used for separating the supply of molten glass into mold charges forms no part of the present invention. One device which may be employed for this purpose is indicated in Fig. 2 in which a forehearth 6 projects from the front of a glass tank 7 and into which the molten glass 8 flows. The forehearth is provided with an outlet 9 and a plunger 10 to regulate the discharge of glass through the outlet to form mold charges suspended therebelow. The mold charges are severed from the glass in the outlet by any well known shears, the blades of which are indicated at 11.

The invention is illustrated as incorporated in an apparatus for delivering glass to a plurality of shaping machines and in order to distribute the mold charges, a guide 12 is arranged below the outlet to guide the falling mold charges to a plurality of chutes or conduits 13, by which they are conveyed to the different shaping machines in the desired succession. As illustrated in Fig. 1, there are two shaping machines indicated briefly at 14 and accordingly there are two chutes 13.

The guide 12 is arranged to move successively into delivering relation with the chutes 13 and for this purpose it is mounted on a standard 16 pivotally mounted in a base 17. The guide is moved to its various delivering positions by a cam 18 (Fig. 1) engaging a roll on the end of an arm 19 connected by a link 20 with a lever 21, the opposite end of which is connected by a link 22 with the lower end of the standard 16. The cam 18 is shaped to swing the guide into alignment with the desired number of chutes and it is driven by gears 23 connected with a main power shaft 24. The shaft is also provided with a gear 26 which may be operatively connected with the shears 11, and other moving parts of the feeder, so as to secure proper timed relation between the swinging of the guide and the delivery of mold charges thereto.

Any desired shaping machine may be employed to receive and shape the mold charges, and the machines represented conventionally at 14 (Fig. 1) indicate simply any known shaping machine having one or more molds 27 to which the charges are delivered. The machines may be driven in any convenient way, so that the presentation of the successive molds shall be in proper synchronism with the delivery of the charges. The machines are herein shown as being driven from the shaft 24 through miter gears 28 and shafts 29 suitably connected with the respective machines to advance the molds successively into receiving relation with the chutes 13.

The drawings show, by way of example, means for elevating the chute 13 into nonreceiving relation with the guide 12 and simultaneously moving a deflector 30 into the path of the glass discharged from the guide, by which it may be directed to any suitable receptacle, such as a cullet pit 31, the mechanism being duplicated for each chute connected with the feeder.

The means for moving the chute and deflector into non-delivering position comprises some form of a motor, such as a cylinder 32, containing a piston 33 mounted on a rod 34, the upper end of which is connected with a part of the deflector 30, so that upon admission of fluid pressure below the piston, the parts will be moved from the position shown in Fig. 2 to that shown in Fig. 3, which will stop the delivery of glass to the shaping machine associated with that particular chute. The connection between the deflector 30 and the chute 13 comprises a block 35 loosely mounted in a slot 36 formed in the upper end of the chute and the lower end of the chute is pivotally mounted on a support 46.

The mechanism may be returned to delivering position upon the release or escape of pressure below the piston 33, but it is preferred to provide means for holding the parts in non-delivering position until they are restored by a manual operation. For this purpose a latch mechanism is provided to hold the parts in elevated position. This mechanism comprises a roll 37 (Figs. 2 and 3) which is mounted on the deflector 30 and engaged by a cam 38 pivotally mounted at 39 and balanced or spring-pressed so as to bear against the roll 37. When the roll and deflector are elevated, the cam turns about the pivot 39 as permitted by the upward movement of the roll, and when the roll reaches its uppermost position, it passes on to a circumferential portion 40 of the cam, which prevents the roll and deflector from dropping until released by turning the cam toward the position of Fig. 2. The cam is provided with a handle 41 which may be connected with a rod 42 running to a position within easy reach of the operator.

In order that the vertical position of the upper end of the chute may be adjusted to secure proper alignment with the guide 12 or for other purposes, the handle 41 is provided with a stop screw 43 positioned to engage the roll 37 when the parts are in delivering position. By adjusting the screw 43 the stopping position of the cam 38 may be varied, thereby adjusting the position of the chute 13 relative to the guide 12.

The piston 33 is preferably actuated by compressed air, and for accomplishing one of the objects of the invention, the admission of pressure to the piston is controlled by a change in the operating condition of the associated machine. This change may be the pre-determined movement of any operating part, such as the clutch for stopping and starting the machine, but for accomplishing a further object, the operation of the charge stopping mechanism is controlled primarily by the abnormal operation of some part of the shaping machine. In the illustrated embodiment of the invention, the abnormal operation of a part of the shaping machine causes the machine to be stopped by the disconnection of its clutch which, in turn, stops the delivery of glass to the machine.

The clutch for driving each of the shaping machines 14 is shown particularly in Fig. 3 as comprising a clutch member 44 which may be integral with one of the gears 28, loosely mounted on the shaft 29, and a sliding clutch member 45 splined to the shaft 29, so that movement of the sliding member 45 will cause the rotation of the shaft 29 to be started or stopped. A lever 47 is provided to slide the member 45 into and out of engagement with the clutch member 44.

The movement of the apparatus into non-delivering position may be controlled directly by the movement of the sliding clutch member 45, and for this purpose it is provided with a flange 48 arranged to engage the stem 49 of a valve 50 when the clutch is moved into stopping position (Fig. 3). When the valve stem is thus moved to the left it opens communication between a pipe 51 connected with a suitable source of air pressure and a pipe 52 leading to the cylinder 32, which pressure causes the piston 33 and chute 13 to be elevated and the delivery of glass to the machine controlled by the clutch, to be stopped. A vent 53 is provided in the top of the cylinder 32 for the escape of air from above the piston and a similar vent 54 (dotted lines) permits the escape of air from beneath the piston when the connection to the source of supply is cut off.

The elevation of the piston causes the parts to be locked in non-delivering position, as shown in Fig. 3, and under ordinary circumstances, delivery of glass to the stopped machine would not be resumed until the machine had again been thrown into operation by the engagement of the clutch members 44 and 45, which cuts off the pressure to the cylinder by closing the valve 50. It is sometimes desired to permit the delivery of a few charges of glass to the machine while it is stopped, and for this purpose manually operated means is provided for cutting off the connection between the pressure holding the piston in elevated position and its source of supply, thereby rendering the automatic operation of the stopping means inoperative. A valve 57 (Figs. 3 and 4) is arranged to close the pipe 52, and at the same time to vent the lower side of the piston to atmosphere. A section of the valve is shown in Fig. 4 in such position that a passageway 58 permits the passage of air through the pipe 52. When the valve is turned through a quarter revolution in the direction of the arrow, the pressure supply is cut off and a passageway 59 permits the pressure confined in the cylinder to escape. In order that the charge stopping mechanism may remain in operative condition, unless restrained by hand, a spring 60 is connected with the handle 61 so as to return the valve to the position shown in Fig. 4 when released by the operator. While the valve is thus held in position by the operator, the movement of the handle 41 to the right in Fig. 3 will permit the chute 12 to drop into delivering position under the action of gravity, but as soon as the handle 61 is released, the parts will at once return to non-delivering position, as shown in Fig. 3.

The valve 50 may be positioned to be engaged by some abnormally positioned part of the shaping machine, instead of by a movable member of the clutch, in which case the delivery of glass to the machine would be stopped while the machine continued to operate. It is preferred, however, to cause the abnormally operating part of the machine to first throw out the clutch to stop the machine, which thereupon stops the delivery of glass. Any desired part of the machine liable to operate abnormally may be employed to throw out the clutch, but for the purpose of illustration there is shown in Fig. 3 a pivoted arm 64 which may be moved from a substantially vertical position into the position of the drawing by the elevating movement of the closed molds below the horizontal part 65, which may be the transfer tongs of the glass shaping machine. If the molds were open at the time of their elevation, the part 65 would not be engaged, but if the closed molds are elevated, the arm 64 will be turned counterclockwise to engage a stem 66 of a pressure releasing valve 67, thus lifting a cover 68 from an exhaust port 69, permitting the escape of pressure from a pipe 70 connected with a cylinder 71 having a piston 72 held to the left against the action of a spring 73 by the pressure in the cylinder. When the pressure is thus released, the spring moves the piston rod 74 to the right, thereby moving the lever 47 into the position shown in Fig. 3, and disconnecting the clutch 44, 45 which operates through the valve 50 to stop the delivery of glass to the machine as has been described. The pressure is supplied to the cylinder 71 through a pipe 76 connected with a suitable source of supply. In order that the pressure may not be built up in the cylinder 71 more rapidly than it escapes through the valve 67 when open, the intake port 77 is very small as compared with the exhaust area through the valve 67.

In order to provide means for simultaneously stopping the delivery of glass to all of the shaping machines, the guide 12 is mounted to swing on a horizontal pivot 80 (Fig. 2), a latch 81 being provided to hold the guide in delivering position. The latch is connected with a handle 82 by which it may be lifted, thereby permitting the guide to swing into a substantially vertical position, out of the path of the falling mold charges. The pivotal portion of the standard is hollow so that the charges may pass therethrough directly to a cullet pit 31.

The operation of the apparatus has been set forth in some detail in connection with the description. When all the shaping machines are operating, the charges will be distributed to the successive molds as they arrive at receiving position. If it is desired to stop the delivery of glass to any machine while it continues to run, the handle 41 may be turned at any time to move the parts into non-delivering position, as shown in the upper part of Fig. 3.

Any part of each machine, or several parts, may each have a valve 50 associated therewith, whereby abnormal operation of any of such parts will stop the delivery of glass to that machine. In the preferred arrangement, the connection between a part of the machine liable to become abnormally positioned, and the means for interrupting the delivery of glass thereto, includes means for stopping the machine, the connection being such that the feed of mold charges will be stopped either upon abnormal operation of the machine, or when the machine is stopped by throwing out its driving clutch. In order to insure that the delivery of glass shall not be resumed until all parts are found to be in proper operating condition, it is preferred that a distinct manual operation shall be required, that is, a movement of the handle 41, to restore the delivery mechanism to operation.

The particular embodiment of the invention illustrated and described, has been selected by way of example only, and it is to be understood that the conjoint use of certain features of the invention, such, for instance, as a plurality of shaping machines associated with a single feeder, are not essential to the invention except as specified in certain of the claims, and that various modifications are included within the broader scope of the invention.

I claim:

1. The combination with a glass shaping machine and a feeder for delivering molten glass thereto, of a deflector movable into the path of the glass to intercept its delivery to the shaping machine, and means rendered operative by a change in the operating condition of the shaping machine for moving the deflector into intercepting position.

2. The combination with a glass shaping machine and a feeder for delivering molten glass thereto, of a normally inoperative deflector, and means rendered operative by abnormal operation of a part of the shaping machine to move the deflector into position to stop the delivery of glass to the machine.

3. The combination with a glass shaping machine and a feeder for delivering molten glass thereto, of a normally inoperative deflector, means rendered operative by the abnormal operation of a part of the shaping machine to move the deflector into position to stop the delivery of glass to the machine, and means for retaining the deflector in operative position.

4. The combination with a glass shaping machine and a feeder for delivering molten glass thereto, of a normally inoperative deflector, means rendered operative by the abnormal operation of a part of the shaping machine to move the deflector into position to stop the delivery of glass to the machine, means for retaining the deflector in operative position, and manually operated means for returning the deflector to inoperative position.

5. The combination with a glass shaping mechine and a feeder for delivering molten glass thereto, of a deflector movable into the path of the glass to interrupt its delivery to the shaping machine, means for disconnecting the shaping machine from its driving means, and means actuated by the said disconnection for moving the deflector into position to stop the delivery of glass to the machine.

6. The combination with a glass shaping machine and a feeder for delivering molten glass thereto, of means for disconnecting the shaping machine from its driving means, and means actuated by the said disconnection for interrupting the delivery of glass to the machine.

7. The combination with a glass shaping machine and means for delivering molten glass thereto, of means for stopping the operation of the shaping machine, and connections between the shaping machine and the delivering means for automatically stopping the delivery of glass to a machine when the machine is stopped.

8. The combination with a glass shaping machine and means for delivering molten glass thereto, of means for stopping the operation of the shaping machine, connections between the shaping machine and the delivering means for automatically stopping the delivery of glass to a machine when the machine is stopped, and manually operated means for resuming the delivery of glass to the machine.

9. The combination with a glass shaping machine and means for delivering molten glass thereto, of automatic means for stopping the delivery of glass upon abnormal operation of the machine, and manually operated means for rendering said automatic means inoperative.

10. The combination with a glass shaping machine and means for delivering glass thereto, of means for stopping the delivery of glass to the machine, automatic means for rendering said stopping means effective while the machine is stopped, and manually operated means for rendering said automatic means inoperative.

11. The combination of a glass feeding machine, a clutch driven shaping machine, and means for delivering the fed glass from the feeding machine to the shaping machine, of mechanism operated by the disconnection of the clutch for stopping the delivering function of the said delivering means.

12. The combination with a glass feeding machine connected by a delivery chute with a shaping machine, of a clutch for driving the shaping machine, and connections between the clutch and the chute whereby the delivering function of the chute is interrupted when the clutch is disconnected.

13. Apparatus for operating on molten glass, having in combination a plurality of glass shaping machines, a source of supply of molten glass, means for delivering glass from the supply to the several machines, independent means for stopping any of said machines, and automatic means for stopping the delivery of molten glass to the stopped machine.

14. Apparatus for operating on molten glass, having in combination a plurality of glass shaping machines, a source of supply of molten glass, means for delivering glass from the supply to the several machines, automatic means for independently stopping any machine upon abnormal operation thereof, and automatic means for stopping the delivery of glass to the stopped machine.

15. Apparatus for operating on molten glass, having in combination a plurality of glass shaping machines, a source of supply of molten glass, means for delivering glass from the supply to the several machines, independent means for stopping the delivery of glass to each machine, and automatic means for rendering said stopping means operative on the abnormal operation of the associated machine.

16. A glass delivering apparatus adapted to deliver mold charges from a feeding machine to a plurality of sets of molds, comprising a conduit associated with each set of molds, and automatic means for independently moving each conduit out of receiving relation with the feeding means.

17. A glass delivering apparatus adapted to deliver mold charges from a feeding machine to a plurality of sets of molds, comprising a conduit associated with each set of molds, and automatic means for independently moving each conduit out of receiving relation with the feeding means and for moving a deflector into position to intercept the mold charges.

18. The combination with a glass delivering apparatus adapted to deliver charges of molten glass to the molds of a shaping machine, of means for stopping the delivery of glass to the molds, a motor for rendering said means operative, a clutch to connect the shaping machine with a source of power, and connections between the clutch and the motor by which a movement of the clutch controls the operation of the motor.

19. The combination with a glass delivering apparatus adapted to deliver charges of molten glass to the molds of a shaping machine, of mean sfor stopping the delivery of glass to the molds, a motor for rendering said means operative, a clutch to connect the shaping machine with a source of power, and connections between the clutch and the motor by which a movement of the clutch controls the operation of the motor.

20. The combination with a glass delivering apparatus adapted to deliver charges of molten glass to molds, of means movable into position to direct the charge away from the molds, a piston and cylinder for moving said directing means, a valve for admitting pressure to the cylinder, and manually operated means for moving the directing means.

21. The combination with a glass delivering apparatus adapted to deliver charges of molten glass to the molds of a shaping machine, of means for stopping the delivery of glass to the molds, a piston and cylinder for moving said means to stopping position, a clutch to connect the shaping machine with a source of power, and a valve actuated by movement of the clutch to control the application of pressure to the cylinder.

22. The combination with a glass delivering apparatus adapted to deliver charges of molten glass to the molds of a shaping machine, of means for stopping the delivery of glass to the molds, a piston and cylinder for moving said means to stopping position, a clutch to connect the shaping machine with a source of power, a valve actuated by movement of the clutch to control the application of pressure to the cylinder, and means actuated by the abnormal operation of the shaping machine for moving the clutch to non-driving position.

23. The combination with a glass delivering apparatus adapted to deliver charges of molten glass to the molds of a shaping machine, of means for stopping the delivery of glass to the molds, a piston and cylinder to move said means to stopping position, and a latch to hold said means in stopping position.

Signed at Hartford, Connecticut, this 13th day of September, 1922.

EDWARD H. LORENZ.